United States Patent
Carvill et al.

(10) Patent No.: US 7,321,526 B2
(45) Date of Patent: Jan. 22, 2008

(54) METHOD AND APPARATUS FOR WATER VELOCITY DECOMPOSITION

(75) Inventors: Charles V. Carvill, Katy, TX (US); Jonathan G. Fried, Lakewood, CO (US)

(73) Assignee: WesternGeco, L.L.C., Houston, TX (US)

( * ) Notice: Subject to any disclaimer, the term of this patent is extended or adjusted under 35 U.S.C. 154(b) by 163 days.

(21) Appl. No.: 10/448,904

(22) Filed: May 30, 2003

(65) Prior Publication Data

US 2004/0240319 A1 Dec. 2, 2004

(51) Int. Cl.
*G01V 1/38* (2006.01)
*G01V 1/36* (2006.01)

(52) U.S. Cl. .................... 367/21; 367/15; 367/50; 367/51

(58) Field of Classification Search ........... 367/15–24, 367/38, 50–51; 181/110, 112
See application file for complete search history.

(56) References Cited

U.S. PATENT DOCUMENTS

| | | | | |
|---|---|---|---|---|
| 4,839,869 A | * | 6/1989 | Corcoran | 367/53 |
| 5,424,999 A | * | 6/1995 | Manin | 367/21 |
| 5,524,100 A | * | 6/1996 | Paffenholz | 367/24 |
| 5,808,964 A | * | 9/1998 | Lailly et al. | 367/53 |
| 6,799,118 B2 | * | 9/2004 | MacKay | 702/16 |
| 6,839,658 B2 | * | 1/2005 | Causse et al. | 702/182 |
| 2003/0074140 A1 | | 4/2003 | MacKay | 702/18 |

OTHER PUBLICATIONS

Fried, Jonathan and MacKay, Scott. "Dynamic Corrections for Water Velocity Variations: A Nove Scotia Case History." GSEG Recorder, Oct. 2001.*

Wombell, Richard. "Water velocity variations in 3-D seismic processin." 66th Annual International Meeting: Soc. of Expl. Geophysics, 1996.*

International PCT Search Report (PCT/US2004/016282) dated May 24, 2004.

MacKay et al., "The Impact Of Water-Velocity Variations On Deepwater Seismic Data," vol. 22, No. 4, pp. 344, 347-350 dated Apr. 2003.

Bertrand et al., "Seawater Velocity Variations And Real-Time Reservoir Monitoring," vol. 22, No. 4, pp. 351-355, dated Apr. 2003.

Barley, "Deepwater problems around the world," *The Leading Edge*, 18(4):488-494, Apr. 1999.

Bertrand et al., "Seawater velocity variations and their impact in permanent installations for reservoir monitoring," SEG Intern. Expo. & 72nd Ann. Mtg., pp. 1684-1687, Salt Lake City, Utah, Oct. 6-11, 2002.

Bertrand et al., "Seawater velocity variations and real-time reservoir monitoring," *The Leading Edge*, 22(4):351-355, Apr. 2003.

Fried and MacKay, "Dynamic corrections for water velocity variations: a Nova Scotia case history," *Canadian Soc. Expl. Geophys. October Technical Luncheon.* pp. 5-8, 11-12, 14-15, 2001.

Fried and MacKay, "Removing distortions caused by water velocity variations: water velocity determination," SEG Intern. Expo. & 72nd Ann. Mtg., pp. 2070-2073, 2002.

(Continued)

*Primary Examiner*—Jack Keith
*Assistant Examiner*—Scott A Hughes
(74) *Attorney, Agent, or Firm*—Ari Pramudji; Liangang (Mark) Ye; Jeffrey E. Griffin (57) ABSTRACT

The present invention provides a method for analyzing traces collected along a plurality of adjacent sail lines in a marine seismic survey area. The method comprises selecting a plurality of trace groups, at least one trace in each group sharing a common midpoint with at least one trace from another group, determining an initial zero-offset travel time for each trace in the trace groups, and generating a plurality of updated zero-offset travel times and a plurality of time corrections for the trace groups using a pre-selected function of the initial zero-offset travel times.

22 Claims, 7 Drawing Sheets

OTHER PUBLICATIONS

International Search Report dated May 24, 2004 for Application No. PCT/US2004/016282.

Levin, "Apparent velocities from dipping interface reflections," *Geophys.*, 36(3):510-516, 1971.

MacKay and Fried, "Removing distortions caused by water velocity variations: method for dynamic correction," SEG Intern. Expo. & 72$^{nd}$ Ann. Mtg., pp. 2074-2077, 2002.

MacKay et al., "The impact of water velocity variations on deepwater seismic data," *The Leading Edge*, 22(4):344, 347-350, Apr. 2003.

Wombell, "Water velocity variations and static corrections in 3D data processing," *EAGE 59$^{th}$ Conf. & Technical Exhibition*, Geneva, Switzerland, Abstract 029, May 26-30, 1997.

Wombell, "Water velocity variations in 3-D seismic processing," 66$^{th}$ Ann. Intern. Mtg. SEG, pp. 1666-1669, 1996.

\* cited by examiner

METHOD AND APPARATUS FOR WATER VELOCITY DECOMPOSITION

BACKGROUND OF THE INVENTION

1. Field of the Invention

This invention relates generally to marine seismic surveying, and, more particularly, to water velocity decomposition in marine seismic surveying.

2. Description of the Related Art

Seismic exploration is widely used to locate and/or survey subterranean geological formations for hydrocarbon deposits. Since many commercially valuable hydrocarbon deposits are located beneath bodies of water, various types of marine seismic surveys have been developed. In a typical marine seismic survey, such as the exemplary survey conceptually illustrated in FIG. 1, an array 100 of marine seismic streamer cables 105 is towed behind a survey vessel 110 over a survey area 115. The seismic streamer cables 105 may be several thousand meters long and contain a large number of sensors 125, such as hydrophones and associated electronic equipment, which are distributed along the length of the each seismic streamer cable 105. The survey vessel 110 also tows one or more seismic sources 120, such as airguns and the like.

Figure 1:
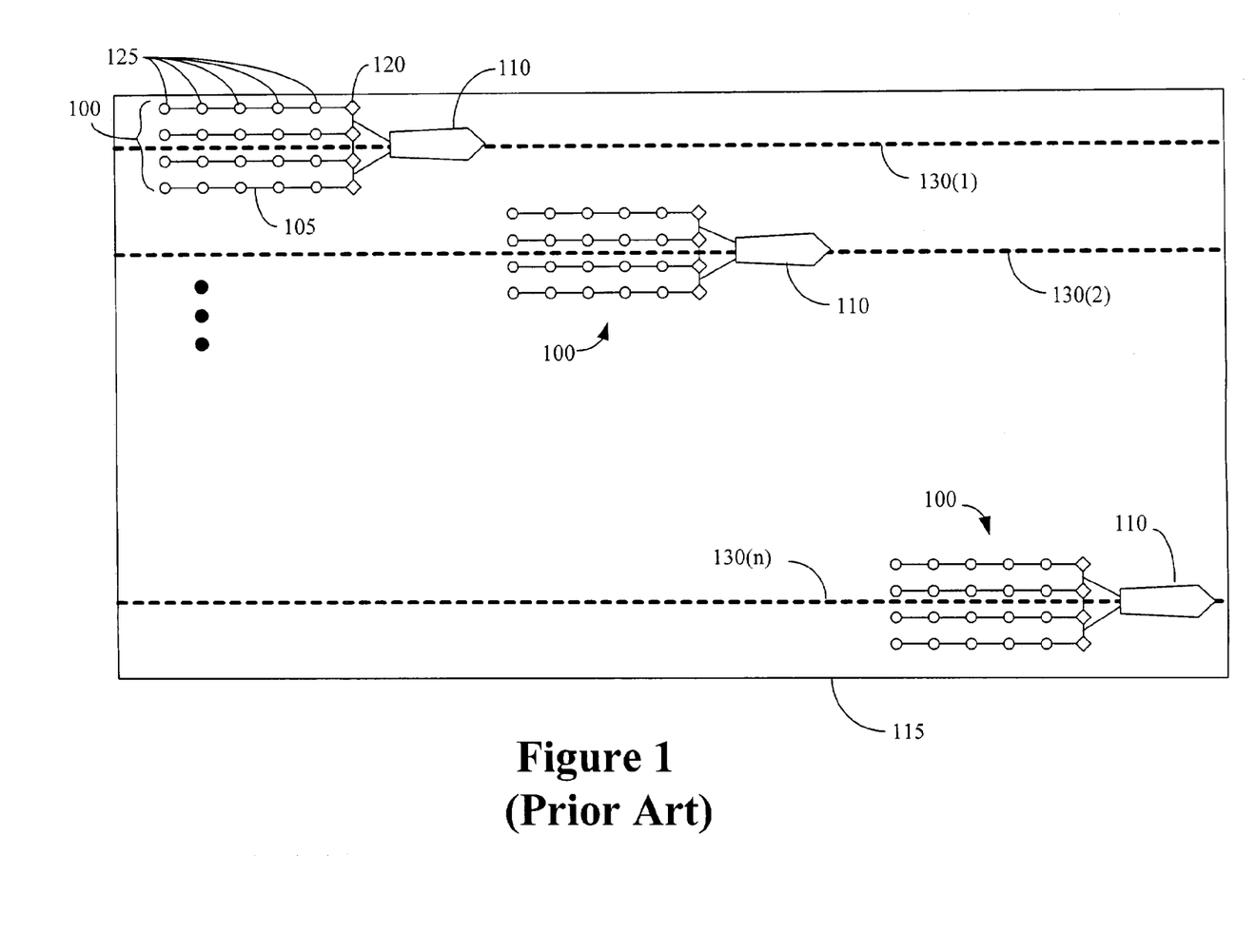
FIG. 1 conceptually illustrates an exemplary prior art marine seismic survey.

As the array 100 is towed over the survey area 115, acoustic signals, or "shots," produced by the seismic sources 120 are directed down through the water into the earth beneath (not shown), where they are reflected from the various subterranean geological formations. The reflected signals are received by the sensors 125 in the seismic streamer cables 105, digitized and then transmitted to the survey vessel 110. The digitized signals are referred to as "traces" and are recorded and at least partially processed at the survey vessel 110. The ultimate aim of this process is to build up a representation of the subterranean geological formations beneath the array 100. Analysis of the representation may indicate probable locations of hydrocarbon deposits in the subterranean geological formations.

Since the area of the array 100 is typically much smaller than the survey area 115, a representation of the earth strata in the survey area 115 may be formed by combining data collected along a plurality of sail lines 130(1-n). For example, a single survey vessel 110 may tow a single array 100 along each of the sail lines 130(1-n). Alternatively, a plurality of survey vessels 110 may tow a plurality of arrays 100 along a corresponding plurality of the sail lines 130(1-n). However, variations in the water conditions, e.g. water temperature, salinity, and the like, between the plurality of sail lines 130(1-n) may cause variations in the velocity of sound in water among the sail lines 130(1-n). For example, the variations in seismic travel time can be on the order of 10 or 20 milliseconds for traces having a small distance between the source and detector for surveys carried out in deeper waters (greater than 200 m). The variations in the seismic wave travel times may shift the temporal position of the various events recorded in the seismic data, including, but not limited to, reflections and refractions of the seismic waves from the subterranean geological formations beneath the array 100. Consequently, the variations in the travel times may make it difficult to analyze the combined seismic data set and may reduce the accuracy of the survey.

Moreover, the data for the sail lines 130(1-n) may be collected at different times. For one example, a single pass along one of the sail lines 130(1-n) may take several hours to complete so, if a single survey vessel 110 is used, data for the first sail line 130(1) will be recorded at an earlier time than data for the last sail line 130(n). For another example, inclement weather and/or high seas may force a survey to be suspended before resuming hours or days later. For yet another example, historical data from previous surveys performed months or years earlier may be combined with new data to extend the survey or to fill in deficiencies in coverage that may be introduced by currents, obstacles such as platforms, and the like. And for yet another example, data from repeat surveys may be used to analyze and monitor changes in productive oil and/or gas reservoirs.

Combining data from different times, and especially from different surveys, may exacerbate the aforementioned difficulties associated with variations in the velocity of sound in the water layer. For example, seasonal variations of the water temperature, salinity, and the like, may cause pronounced variations in the velocity of sound in water. For another example, shifts in water currents may cause unpredictable variations in the velocity of sound in water, particularly for surveys carried out near the edge of strong water currents.

The seismic data is commonly corrected for the variations in the velocity of sound in water by computing one or more so-called "delta t" ($\Delta t$) values, which are typically defined as a difference between an expected travel time, usually based on an assumed ideal water velocity, and a measured travel time for one or more seismic signals. For example, the assumed ideal water velocity may be a constant velocity or one with very smooth spatial changes in velocity.

In one conventional method of determining the delta-t values (described in Wombell, R., 1996, "Water velocity variations in 3-D seismic processing," 66th Ann. Internat. Mtg: Society of Exploration Geophysicists, Expanded Abstracts, 1666-1669.), normal move-out stacking velocities and zero-offset water bottom times are computed along adjacent sail lines. The velocities are then converted to zero offset travel time differences using the formula: $\Delta t = T_w (\Delta V_w / V_w)$, where $\Delta t$ is the difference in two-way travel time at zero offset due to the change in water velocity, $T_w$ is the zero offset water bottom time, $V_w$ is the reference water velocity chosen by the practitioner, and $\Delta V_w$ is the difference between $V_w$ and the computed stacking velocity. The delta-t values are then applied to normal move-out corrected seismic data. One problem with this method is that the velocity analysis must be extremely accurate. Another issue is the effect of water bottom structure on the velocity analysis. If the dip of the water bottom (the angle the water bottom makes with a horizontal plane) changes between or along sail lines, the calculated velocities are strongly affected and may reduce the accuracy of the $\Delta t$ calculation.

Another method of determining the delta-t values that may be used to form combined data sets is described in Fried, J., and MacKay, S., 2001, "Dynamic Corrections for Water Velocity Variations: a Nova Scotia case history," Canadian Society of Exploration Geophysicists, October 2001 technical luncheon. In this method, normal move-out corrections are applied to pick times with a single velocity. The corrected pick times are then averaged for each combination of sail line, cross line, and common midpoint. The differences between sail line-cross line groups having overlapping midpoints are then evaluated and reduced using an iterative method. The method produces delta-t values that are used to apply a dynamic correction to the seismic data. One difficulty with this method is that the averaged pick times are affected by the difference between the actual normal move-out and the approximate normal move-out applied to correct the pick times. The effect of these differences propagates into the delta-t values. Reducing the offset range of pick times used in the average reduces the differences between the actual normal move-out and the approximate normal move-out applied to correct the pick times. However, reducing the offset range may also reduce the amount of overlapping data upon which the method depends. Also, since the move-out is affected by the dip of the water bottom, changes in dip between sail lines can also affect the delta-t values. Furthermore, the iteration procedures used in this method are difficult to apply in practice.

SUMMARY OF THE INVENTION

In one aspect of the present invention, a method is provided for analyzing traces collected along a plurality of adjacent sail lines in a marine seismic survey area. The method includes selecting a plurality of trace groups, at least one trace in each group sharing a common midpoint with at least one trace from another group. The method also includes determining an initial zero-offset travel time for each trace in the trace groups, and generating a plurality of updated zero-offset travel times and a plurality of time corrections for the trace groups using a pre-selected function of the initial zero-offset travel times. The present invention may also include an article comprising one or more machine-readable storage media containing instructions that when executed enable a computer to perform the above method.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
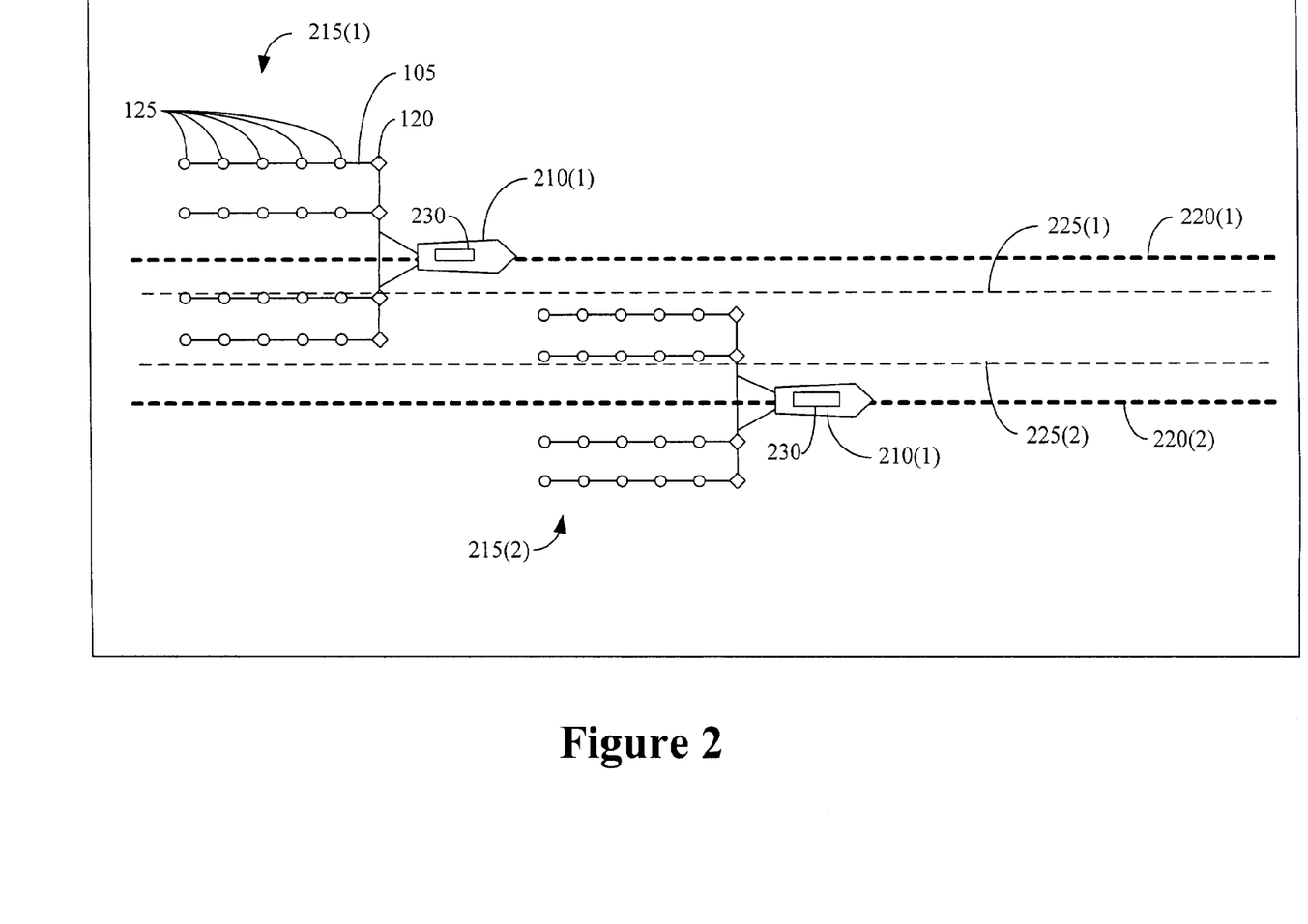
FIG. 2 conceptually illustrates two adjacent sail lines of a marine seismic survey area.

FIG. 2 conceptually illustrates a marine seismic survey area 200. To survey the marine seismic survey area 200, one or more survey vessels 210(1-2) tow one or more seismic arrays 215(1-2) over the marine seismic survey area 200. It will be appreciated that, while the survey vessels 210(1-2) typically operate on the surface of the sea, the marine seismic survey area 200 refers to a portion of the sea bed. Furthermore, the present invention is not limited to undersea exploration, and may also be applied to surveys undertaken in freshwater, brackish water, and the like.

In the illustrated embodiment, the seismic arrays 215(1-2) include a plurality of seismic sources 120 and seismic sensors 125, such as hydrophones, geophones, and the like, which may be coupled to the survey vessel 210(1-2) by cables 105. However, in some alternative embodiments, the seismic sensors 125 can be deployed on the ocean bottom instead of being towed behind the survey vessels 210(1-2). For example, the seismic sensors 125 may be deployed on one or more ocean-bottom cables ("OBC"). The OBCs may be deployed on the seafloor so that the seismic sensors 125 may record and relay data to the seismic survey vessels 210(1-2). Furthermore, in other alternative embodiments, the seismic sources 120 may not be incorporated into the seismic arrays 215(1-2). In one alternative embodiment, the seismic sources 120 may be deployed on buoys (not shown). In another alternative embodiment, the seismic sources 120 may be towed by a second vessel (not shown).

The survey vessels 210(1-2) tow the seismic arrays along a plurality of sail lines, such as the two adjacent sail lines 220(1-2). In one embodiment, cross-currents and/or the spacing of the sail lines 220(1-2) may cause the seismic arrays 215(1-5) to overlap in a region defined by dashed lines 225(1-2). The deviation of the sail lines 220(1-2) caused by cross-currents is sometimes referred to as "feathering." Although only two adjacent sail lines 220(1-2) are shown in FIG. 2A, persons of ordinary skill in the art having benefit of the present disclosure will appreciate that surveying the marine seismic survey area 200 typically requires more than two adjacent sail lines 220(1-2). For example, a survey covering an area of 40×70 miles requires about 160 sail lines 200(1-2), with each sail line 200(1-2) cap about 1300 feet of subsurface coverage perpendicular to the direction of boat travel.

Figure 3A:
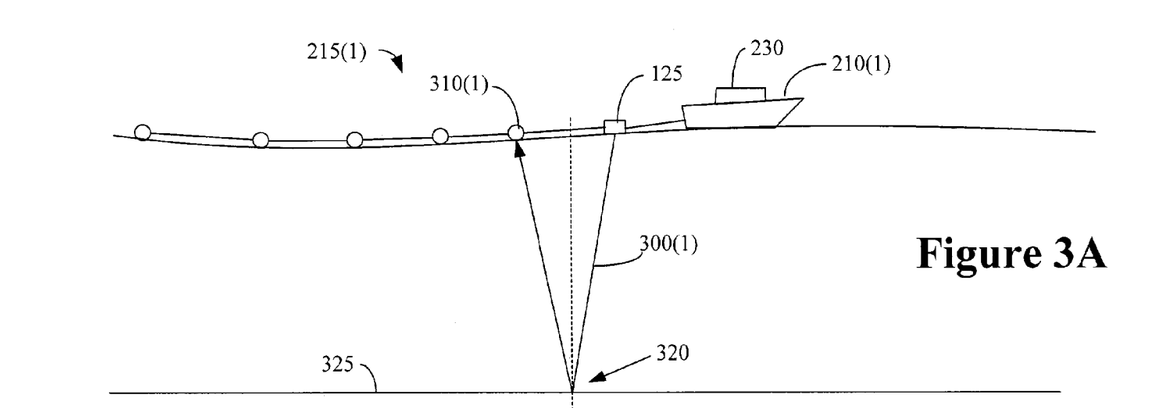
FIGS. 3A and 3B conceptually illustrate a survey vessel at two locations, as well as acoustic signals generated by the survey vessel, and reflected signals received by the survey vessel.
Figure 3B:
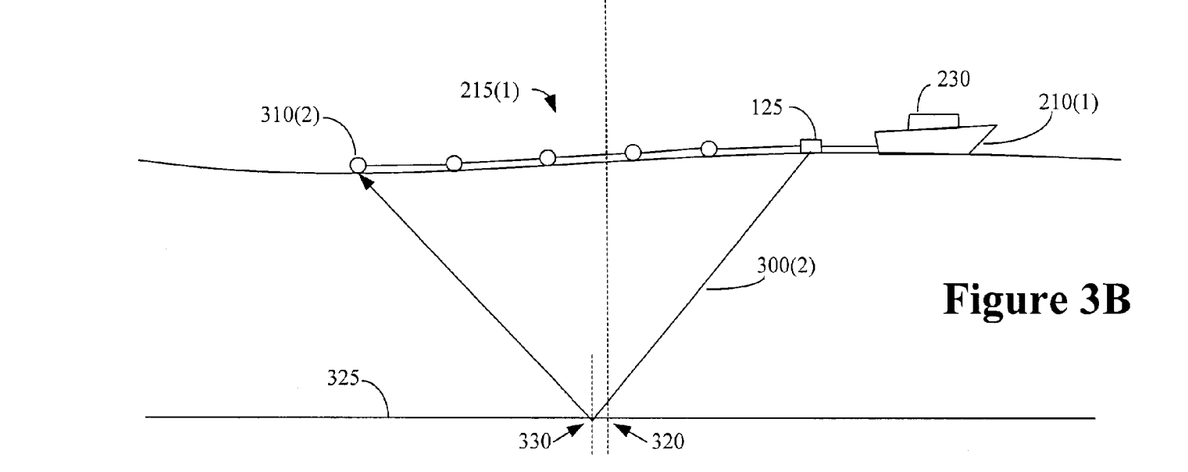

FIGS. 3A and 3B conceptually illustrate a side view of the survey vessel 210(1) and a portion of the seismic array 215(1) at two different locations. In operation, the seismic source 125 shown in FIG. 3A provides an acoustic signal 300(1) that propagates to a seismic sensor 310(1) through a reflection point 320 located on a sea floor 325 between the seismic source 125 and the seismic sensor 310(1). Similarly, the seismic source 125 provides an acoustic signal 300(2) that propagates to a seismic sensor 310(2) through a reflection point 330, as shown in FIG. 3B. In the illustrated embodiment, the sea floor 325 is flat and so the reflection points 320, 330 are half-way between the seismic source 125 and the seismic sensors 310(1-2). However, those of ordinary skill in the art will appreciate that the reflection points 320, 330 may not necessarily be located half-way between the seismic source 125 and the seismic sensors 310(1-2). For example, a dipping sea floor 325 may change the location of the reflection points 320, 330.

In one embodiment, signals are generated by the seismic sensors 310(1-2) in response to receiving the reflected and/or refracted acoustic signals 300(1-2) and then the generated signals are transmitted to a signal processing unit 230 on the survey vessel 210(1-2). In the illustrated embodiment, the signal processing unit 230 uses the transmitted signals to form one or more traces representative of the reflected and/or refracted acoustic signals 300(1-2), in a manner well known in the art. The signals and/or the traces may be stored on any storage medium, including, but not limited to, recording tape, magnetic disks, compact disks, and DVDs. Some embodiments may also, in addition to or in lieu of storing the signals and/or the traces, transmit them to an on-shore facility. This may be done, for example, over a satellite link.

The traces may be grouped according to the location of the reflection points 320, 330. For example, in the embodiment illustrated in FIG. 4, the marine seismic survey area 200 is divided into a plurality of midpoint cells 401. The signals provided by the seismic array 215(1) (not shown in FIG. 4) during a single pass over the marine seismic survey area 200 have reflection points 320 that are distributed in a band 405(1) of midpoint cells 401. Similarly, the signals provided by the seismic array 215(2) (not shown in FIG. 4) during a single pass over the marine seismic survey area 200 may have reflection points 330 that are distributed in a band 405(2) of midpoint cells 401.

In the illustrated embodiment, the bands 405(1-2) overlap. In one embodiment the overlapping may be intentional. For example, the distance between the sail lines 220(1-2) may be selected so that the bands 405(1-2) overlap in an overlap region 410, indicated by cross-hatching in FIG. 4. In another embodiment, the overlapping may be unintentional. For example, cross-currents in the water may bend or feather the cables 105:such that the bands 405(1-2) overlap in the overlap region 410. In yet another embodiment, the bands 405(1-2) may not physically overlap, but an artificial overlap may be introduced while processing the data, as will be described in more detail below.

Figure 4:
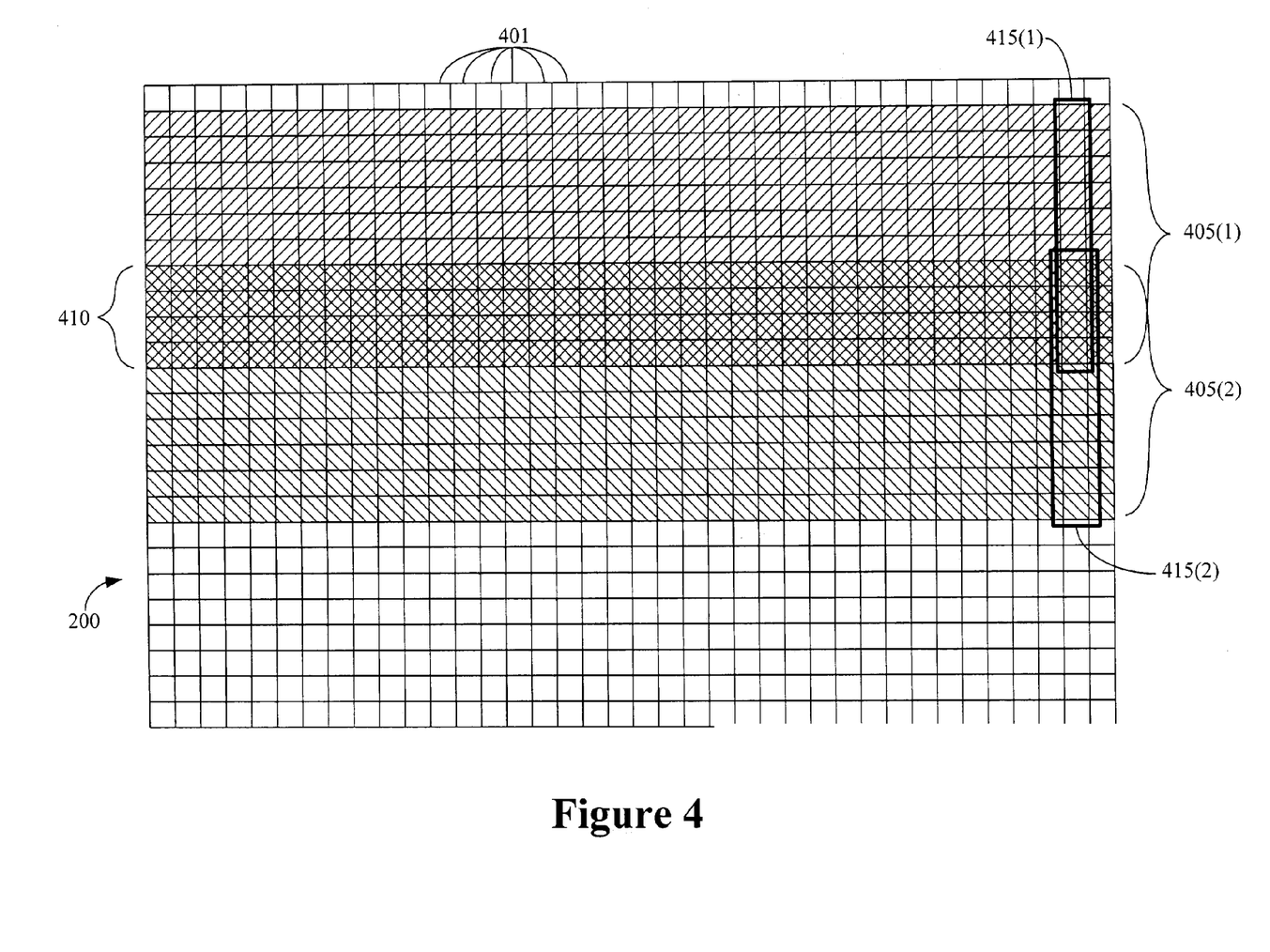
FIG. 4 conceptually illustrates a plurality of midpoint cells in the marine seismic survey area shown in FIG. 2.

Traces having a common midpoint cell 401 may be grouped together, a process known variously in the art as bringing the traces to a common midpoint, forming a common midpoint gather, and the like. Furthermore, the midpoint cells 401 may be combined into cross-line groups 415(1-2). Traces corresponding to the midpoint cells 401 in the cross-line groups 415(1-2) may also be grouped together. As shown in FIG. 4, traces associated with different sail lines 220(1-2) may be grouped together. For example, one or more traces associated with sail line 220(1) may share a common midpoint cell 401, such as one of the midpoint cells 410 in the overlap region 410, with one or more traces associated with sail line 220(2), in which case the two or more traces would be included in the appropriate common midpoint gather.

The grouped traces may then be stacked to form a representation of various structures (not shown) within the sea bed and above the seabed in the subsurface marine seismic survey area 200, in a manner well known to those of ordinary skill in the art. However, as discussed above, variations in the water conditions, e.g. water temperature, salinity, and the like, may cause variations in the velocity of sound in water among the trace groups, which may make it difficult to analyze the combined data set and may reduce the accuracy of the survey. In accordance with common usage in the art, the velocity of sound in water will hereinafter be referred to as the "water speed" or the "water velocity."

Figure 5:
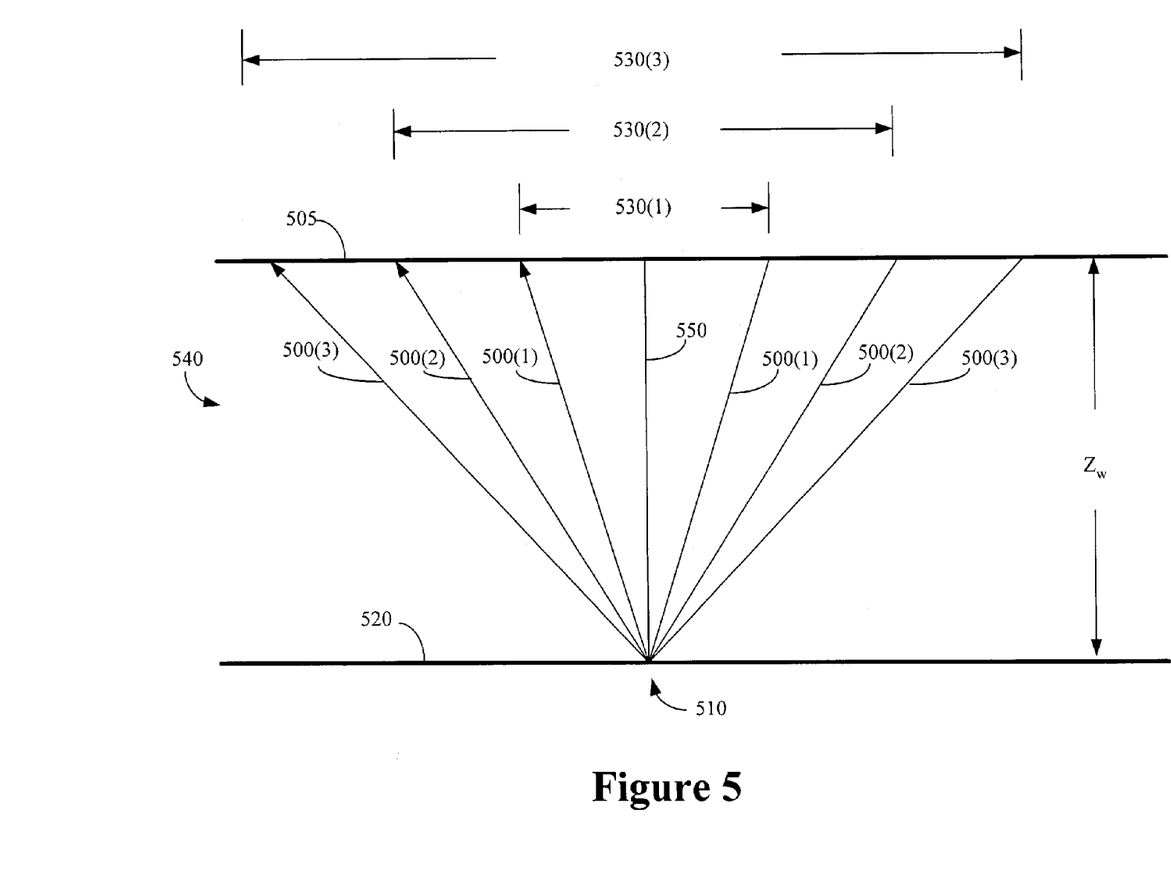
FIG. 5 conceptually illustrates a plurality of signal paths from a surface through a midpoint on a sea floor and back to the surface.

FIG. 5 conceptually illustrates a plurality of signal paths 500(1-3) from a surface 505 through a common midpoint cell 510 at a sea floor 520 and back to the surface 505. Each signal path 500(1-3) has a corresponding offset 530(1-3), which represents a horizontal separation of the seismic source and seismic sensor. Thus, for a water layer 540 having a depth $Z_w$ and a velocity of sound in water, or a water speed, of $V_w$, an acoustic signal that propagates along the signal paths 500(1-3) has a corresponding travel time $T_{1-3}$ given by the formula $T_{1-3}=(T_0^2+X_{1-3}^2/V_w^2)^{1/2}$, where $X_{1-3}$ is the length of the corresponding offset 530(1-3) and $T_0=2Z_w/V_w$ is the vertical two-way travel time, i.e. the travel time of an acoustic signal propagating along the line 550. The vertical two-way travel time is also referred to hereinafter as the zero-offset travel time.

When combining traces formed from signals that propagate along the signal paths 500(1-3), it is conventional to apply a so-called normal move-out (NMO) correction to the traces. The NMO correction includes transforming a time coordinate of the traces using the equation $T_{0,1-3}=(T_{1-3}^2-X_{1-3}^2/V_w^2)^{1/2}$. If the water speed $V_w$ is the same for all the traces, then the NMO-corrected travel times $T_{0,1-3}$ are all equal to a zero-offset travel time $T_0$. Grouping and/or combining the NMO-corrected traces often improves the representation of the marine seismic survey area 200 by, e.g., increasing the signal-to-noise ratio of the data. However, as discussed above, variations in the water conditions, e.g. water temperature, salinity, and the like, between the plurality of sail lines 200(1-2) may cause sail-line-to-sail-line variations in the water speed, such that the NMO-corrected travel times $T_{0,1-3}$ are different for different traces.

Figure 6:
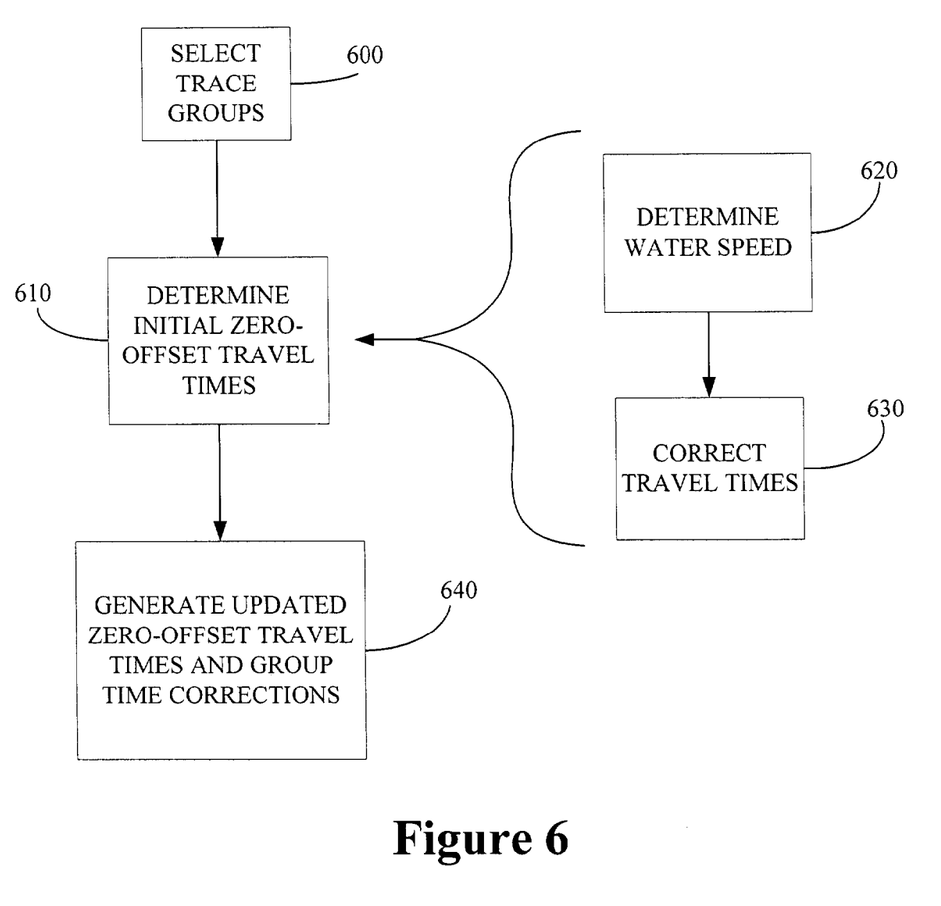
FIG. 6 conceptually illustrates a method for analyzing traces collected along a plurality of adjacent sail lines, such as the sail lines shown in FIG. 2.

FIG. 6 conceptually illustrates a method for analyzing traces collected along a plurality of adjacent sail lines (e.g., the sail lines 220(1-2) shown in FIG. 2) in a marine seismic survey area 200. Groups of traces are selected (at 600). In one embodiment, selecting (at 600) the trace groups includes gathering traces having a common midpoint cell 510 in a common cross-line group 415(1-2), as discussed above. The physical and/or artificial overlapping of the bands 405(1-2), as discussed above, results in at least one trace in each group sharing a common midpoint with at least one trace from another group. However, any desirable grouping that includes at least one trace in each group sharing a common midpoint with at least one trace from another group may be used.

In the illustrated embodiment, an initial zero-offset travel time $T_n(i,j,k)$ for each trace in the trace groups is then determined (at 610). In one embodiment, the initial zero-offset travel times $T_n(i,j,k)$ are determined (at 610) by determining (at 620) the water speed $V(j,k)$ using the set of equations:

$$T(i,j,k)^2=T_0(j,k)^2+X(i,j,k)^2S(j,k)^2 \qquad (1)$$

In equation (1), the index "i" refers to a particular trace, the index "j" refers to the midpoint, the index "k" refers to the selected group, and $S(j,k)$ is the inverse of the water speed $V(j,k)$. The inverse of the water speed is also referred to hereinafter as the "slowness." The times $T(i,j,k)$ used in equation (1) are pick times determined by identifying the water bottom reflection. However, in alternative embodiments, other selected portions of the seismic data may be used to determine (at 620) the water speed V(j,k), as will be appreciated by those of ordinary skill in the art.

Equation (1) may be solved for $T_0(j,k)$ and $S(j,k)$ using a variety of techniques well known to those of ordinary skill in the art. For example, best-fit values of $T_0(j,k)$ and $S(j,k)$ may be determined using a least-squares fitting technique. In one embodiment, the determined slowness $S(j,k)$ is then averaged over common midpoints using the equation:

$$S(k) = \Sigma n(j,k) S(j,k) / \Sigma n(j,k) \qquad (2)$$

The summation in equation (3) is taken over the index "j" and n(j,k) is the number of traces in the gather contributing to S(j,k). However, those of ordinary skill in the art will appreciate that, in alternative embodiments, other selected portions of the seismic data and/or alternative techniques may also be used to determine (at 620) the water speed. The alternative techniques include, but are not limited to, other averaging techniques, estimation procedures, direct measurements, and the like. These techniques may be applied to the pick times and/or the other selected portions of the seismic data.

In the illustrated embodiment, the initial zero-offset travel times $T_n(i,j,k)$ are determined (at 610) by NMO-correcting (at 630) the pick times $T(i,j,k)$ using the slowness $S(k)$ and the equation:

$$T_n(i,j,k) = (T(i,j,k)^2 - X(i,j,k)^2 S(k)^2)^{1/2} \qquad (3)$$

A plurality of updated zero-offset travel times $T_0(j)$ and a plurality of time corrections $\Delta t(k)$ are generated (at 640) using the initial zero-offset travel times $T_n(i,j,k)$. In one embodiment, the initial zero-offset travel times $T_n(i,j,k)$ are modeled as a linear combination of the updated zero-offset travel times $T_0(j)$ and a plurality of time corrections $\Delta t(k)$, as in the equation:

$$T_n(i,j,k) = T_0(j) + \Delta t(k) \qquad (4)$$

Equation (4) may then be solved for the updated zero-offset travel times $T_0(j)$ and a plurality of time corrections $\Delta t(k)$ using a variety of techniques well known to those of ordinary skill in the art.

In one embodiment, a smoothing term may be added to equation (4) such that traces from different groups overlap in a mathematical sense. The mathematical overlap smoothes the updated zero-offset travel times $T_0(j)$ and the plurality of time corrections $\Delta t(k)$ such that traces from non-overlapping groups may be used to constrain equation (4) and a solution may be obtained. For example, replacing $T_0(j)$ with $(T_0(j-1) + T_0(j) + T_0(j+1))/3$, where j−1 and j+1 refer to midpoint cells adjacent to midpoint cell indicated by the index j, connects the traces in adjacent cells such that the traces overlap in a mathematical sense.

Equation (4) may be used to form a least-squares error function:

$$\varepsilon^2 = \sum_{i,j,k} (T_n(i,j,k) - (T_0(j) + \Delta t(k)))^2 + \lambda \sum \Delta t(k)^2 \qquad (5)$$

The first sum in equation 5 is taken over all i, j, k. In one embodiment, the term $\lambda$ is a very small value and the term $\lambda \Sigma \Delta t(k)^2$ is a regularization term designed to restrict $\Delta t(k)$ to small values in comparison to $T_0(j)$. In one alternative embodiment, the term $\lambda$ may be set equal to zero. The least-squares error function defined in equation (5) may be solved for the updated zero-offset travel times $T_0(j)$ and the plurality of time corrections $\Delta t(k)$ that minimize the error using a Gauss-Seidel method. However, those of ordinary skill in the art will appreciate that equations (4) and (5) may be solved by a variety of techniques. For example, in one alternative embodiment, equation (4) may be solved using a conjugate gradient method. In yet another alternative embodiment, additional constraints may be added to equation (4) to facilitate a solution.

Figures 7A, 7B:
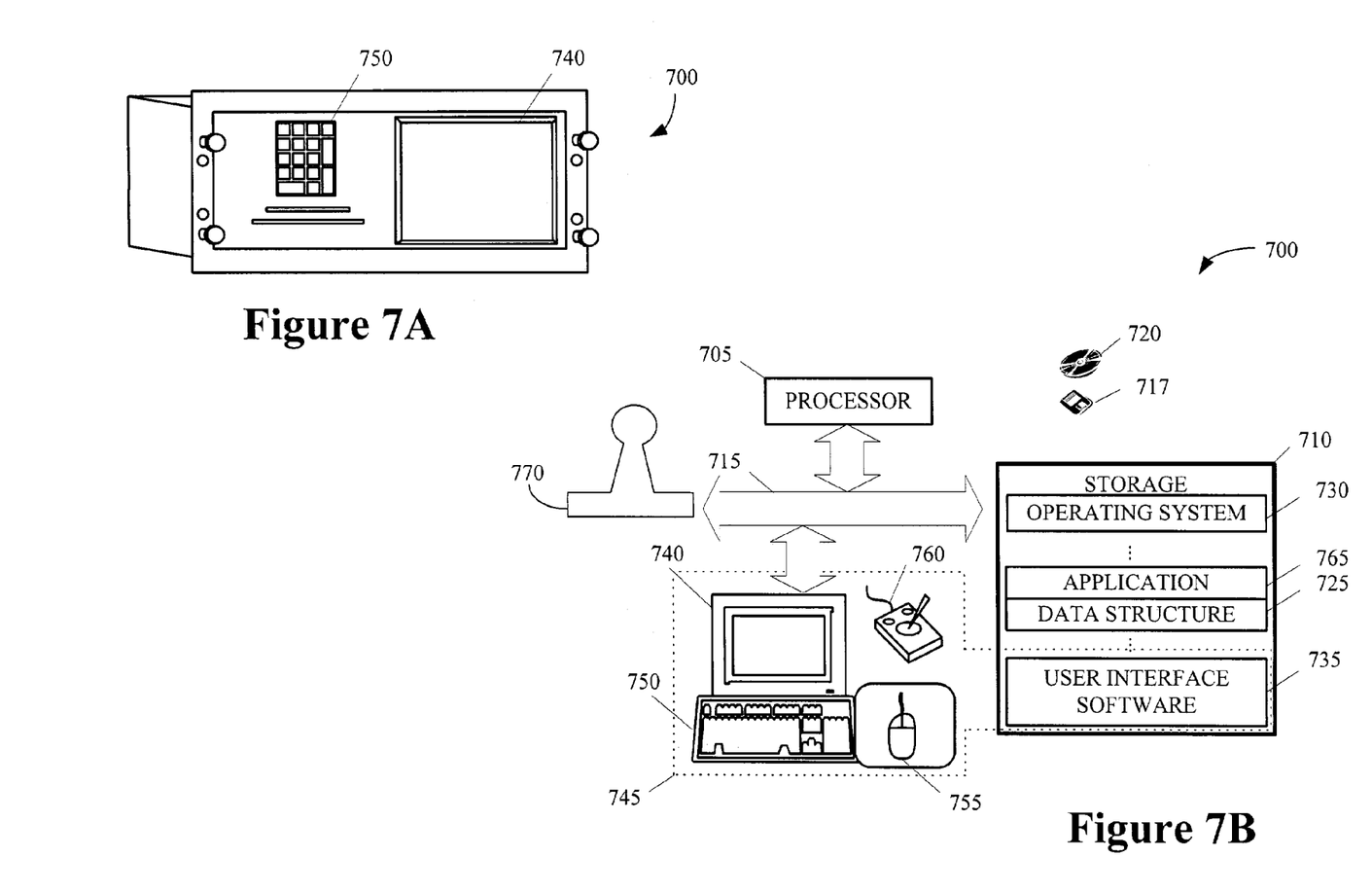
FIGS. 7A and 7B conceptually illustrate aspects of a computing apparatus that may be used to implement the method shown in FIG. 6.

FIGS. 7A and 7B show a computing apparatus 700 that may be used to perform the aforementioned operations. The computing apparatus 700 includes a processor 705 communicating with some storage 710 over a bus system 715. The storage 710 may include a hard disk and/or random access memory ("RAM") and/or removable storage such as a floppy magnetic disk 717 and an optical disk 720. The storage 710 is encoded with a data structure 725 storing the signals collected as discussed above, an operating system 730, user interface software 735, and an application 765. The user interface software 735, in conjunction with a display 740, implements a user interface 745. The user interface 745 may include peripheral I/O devices such as a key pad or keyboard 750, a mouse 755, or a joystick 760. The processor 705 runs under the control of the operating system 730, which may be practically any operating system known to the art. The application 765 is invoked by the operating system 730 upon power up, reset, or both, depending on the implementation of the operating system 730.

As discussed above, data collected during the marine seismic survey may be communicated to the computing apparatus 700 via any storage medium, including, but not limited to, recording tape, magnetic disks, compact disks, and DVDs. The data collected during the marine seismic survey may also be communicated directly to the computing apparatus 700 by, e.g., a satellite link 770, and stored in the storage 710. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of analyzing traces collected along a plurality of adjacent sail lines in a marine seismic survey area, comprising:
   selecting a plurality of trace groups, at least one trace in each group sharing a common midpoint with at least one trace from another group;
   determining an initial zero-offset travel time for each trace in the trace groups; and
   generating a plurality of updated zero-offset travel times and a plurality of time corrections for the trace groups using a least-squares error function of the initial zero-offset travel times, wherein generating the plurality of updated zero-offset travel times and the plurality of time corrections comprises applying a Gauss-Seidel method to the least squares error function.

2. A method of analyzing traces collected along a plurality of adjacent sail lines in a marine seismic survey area, comprising:
   selecting a plurality of trace groups, at least one trace in each group sharing a common midpoint with at least one trace from another group;
   determining an initial zero-offset travel time for each trace in the trace groups; and
   generating a plurality of updated zero-offset travel times and a plurality of time corrections for the trace groups using a least-squares error function of the initial zero-offset travel times, wherein generating the plurality of updated zero-offset travel times and the plurality of time corrections comprises applying a conjugate gradient method to the least squares error function.

3. A method of analyzing traces collected along a plurality of adjacent sail lines in a marine seismic survey area, comprising:
   selecting a plurality of trace groups, at least one trace in each group sharing a common midpoint with at least one trace from another group; and
   determining an initial zero-offset travel time for each trace in the trace groups; and
   generating a plurality of updated zero-offset travel times and a plurality of time corrections for the trace groups using a least-squares error function of the initial zero-offset travel times, wherein selecting the trace groups comprises selecting the trace groups such that at least one trace from each group is associated with an artificially overlapping region that is formed using a mathematical smoothing term.

4. An article comprising one or more machine-readable storage media containing instructions that when executed enable a computer to:
   select a plurality of trace groups, at least one trace in each group sharing a common midpoint with at least one trace from another group;
   determine an initial zero-offset travel time for each trace in the trace groups; and
   generate a plurality of updated zero-offset travel times and a plurality of time corrections for the trace groups using a least-squares error function of the initial zero-offset travel times by applying at least one of a Gauss-Seidel method and a conjugate gradient method to the least-squares error function of the initial zero-offset travel times.

5. The article of claim 4, wherein the one or more machine-readable storage media contain instructions that when executed enable the computer to select the plurality of trace groups by selecting a plurality of trace groups associated with a corresponding plurality of cross-line groups.

6. An article comprising one or more machine-readable storage media containing instructions that when executed enable a computer to:
   select a plurality of trace groups, at least one trace in each group sharing a common midpoint with at least one trace from another group;
   determine an initial zero-offset travel time for each trace in the trace groups;
   generate a plurality of updated zero-offset travel times and a plurality of time corrections for the trace groups using a least-squares error function of the initial zero-offset travel times; and
   select the at least one trace by selecting the traces from a mathematical overlap region formed using a smoothing term.

7. An article comprising one or more machine-readable storage media containing data structures and data formed by:
   selecting a plurality of trace groups, at least one trace in each group sharing a common midpoint with at least one trace from another group;
   determining an initial zero-offset travel time for each trace in the trace groups; and
   generating a plurality of updated zero-offset travel times and a plurality of time corrections for the trace groups using a least-squares error function of the initial zero-offset travel times, wherein generating the plurality of updated zero-offset travel times and the plurality of time corrections for the trace groups using the least-squares error function of the initial zero-offset travel times comprises applying at least one of a Gauss-Seidel method and a conjugate gradient method to the least-squares error function of the initial zero-offset travel times.

8. An article comprising one or more machine-readable storage media containing data structures and data formed by:
   selecting a plurality of trace groups, at least one trace in each group sharing a common midpoint with at least one trace from another group;
   determining an initial zero-offset travel time for each trace in the trace groups; and
   generating a plurality of updated zero-offset travel times and a plurality of time corrections for the trace groups using a least-squares error function of the initial zero-offset travel times, wherein selecting the plurality of trace groups comprises selecting the plurality of trace groups such that at least one trace in each group is associated with a mathematical overlap region.

9. A method of analyzing traces collected along a plurality of adjacent sail lines in a marine seismic survey area, comprising:
selecting a plurality of trace groups, at least one trace in each group sharing a common midpoint with at least one trace from another group;
determining an initial zero-offset travel time for each trace in the trace groups; and
generating a plurality of updated zero-offset travel times and a plurality of time corrections for the trace groups based on $T_n(i, j, k)=T_o(j)+\Delta t(k)$, wherein $T_n(i, j, k)$ represents the initial zero-offset travel times, $T_o(j)$ represents the updated zero-offset travel times and $\Delta t(k)$ represents the time corrections; and
adding a smoothing term to $T_n(i, j, k)=T_o(j)+\alpha t(k)$ such that one or more traces from different trace groups mathematically overlap.

10. The method of claim 9, further comprising forming a least-squares error function using $T_n(i, j, k)=T_o(j)+\Delta t(k)$.

11. A method of analyzing traces collected along a plurality of adjacent sail lines in a marine seismic survey area, comprising:
selecting a plurality of trace groups, at least one trace in each group sharing a common midpoint with at least one trace from another group;
determining an initial zero-offset travel time for each trace in the trace groups; and
generating a plurality of updated zero-offset travel times and a plurality of time corrections for the trace groups based on $T_n(i, j, k)=T_o(j)+\Delta t(k)$, wherein $T_n(i, j, k)$ represents the initial zero-offset travel times, $T_o(j)$ represents the urdated zero-offset travel times and $\Delta t(k)$ represents the time corrections; and
using $T_n(i, j, k)=T_o(j)+\Delta t(k)$ to form a least-squares error function $$\varepsilon^2 = \sum_{i,j,k} (T_n(i, j, k) - (T_0(j) + \Delta t(k)))^2 + \lambda \sum \Delta t(k)^2,$$

where $T_o(j)$ represents the updated zero-offset travel times, $\Delta t(k)$ represents the time corrections and $\lambda \Sigma \Delta t(k)^2$ is a regularization term designed to restrict $\Delta t(k)$ to small values in comparison to $T_o(j)$.

12. The method of claim 11, further comprising solving the least-squares error function for the updated zero-offset travel times and the time corrections.

13. The method of claim 11, wherein $\lambda$ is set to zero.

14. The method of claim 11, wherein selecting the trace groups comprises selecting the trace groups such that at least one trace from each group is associated with an overlap region.

15. The method of claim 11, further comprising adding one or more constraints to the least-squares error function.

16. The method of claim 11, wherein determining the initial zero-offset travel time for each trace in the plurality of groups comprises:
estimating a water speed; and
determining the initial zero-offset travel time from the estimated water speed.

17. The method of claim 16, wherein estimating the water speed comprises averaging a plurality of water bottom reflection velocities corresponding to a plurality of midpoint cells in the marine seismic survey area.

18. The method of claim 17, wherein selecting the plurality of trace groups comprises selecting a plurality of trace groups associated with a corresponding plurality of cross-line groups of the midpoint cells.

19. The method of claim 16, wherein estimating the water speed comprises averaging a plurality of water bottom reflection velocities corresponding to the plurality of groups.

20. The method of claim 16, wherein determining the initial zero-offset travel time for each trace comprises performing a normal move-out correction to a travel time of each trace using the estimated water speed.

21. A method of analyzing traces collected along a plurality of adjacent sail lines in a marine seismic survey area, comprising:
selecting a plurality of trace groups, at least one trace in each group sharing a common midpoint with at least one trace from another group;
determining an initial zero-offset travel time for each trace in the trace groups; and
generating a plurality of urdated zero-offset travel times and a plurality of time corrections for the trace groups based on $T_n(i, j, k)=T_o(j)+\Delta t(k)$, wherein $T_n(i, j, k)$ represents the initial zero-offset travel times, $T_o(j)$ represents the urdated zero-offset travel times and $\Delta t(k)$ represents the time corrections;
forming a least-squares error function using $T_n(i, j, k)=T_o(j)+\Delta t(k)$; and
solving the least-squares error function for the updated zero-offset travel times and the time corrections using the Gauss-Seidel method.

22. A method of analyzing traces collected along a plurality of adjacent sail lines in a marine seismic survey area, comprising:
selecting a plurality of trace groups, at least one trace in each group sharing a common midpoint with at least one trace from another group;
determining an initial zero-offset travel time for each trace in the trace groups; and
generating a plurality of updated zero-offset travel times and a plurality of time corrections for the trace groups based on $T_n(i, j, k)=T_o(j)+\Delta t(k)$, wherein $T_n(i, j, k)$ represents the initial zero-offset travel times, $T_o(j)$ represents the updated zero-offset travel times and $\Delta t(k)$ represents the time corrections; and
solving $T_n(i, j, k)=T_o(j)+\Delta t(k)$ using a conjugate gradient method.

* * * * *